United States Patent
Czompo

(10) Patent No.: US 8,692,689 B2
(45) Date of Patent: Apr. 8, 2014

(54) VEHICLE CONTEXT AWARENESS BY DETECTING ENGINE RPM USING A MOTION SENSOR

(75) Inventor: Joseph Czompo, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 13/106,786

(22) Filed: May 12, 2011

(65) Prior Publication Data

US 2012/0286973 A1 Nov. 15, 2012

(51) Int. Cl.
*G08G 1/01* (2006.01)
*H04M 3/42* (2006.01)

(52) U.S. Cl.
USPC .......................... 340/933; 455/414.2

(58) Field of Classification Search
None
See application file for complete search history.

(56) References Cited

U.S. PATENT DOCUMENTS

| | | |
|---|---|---|
| 2002/0151297 A1 | 10/2002 | Remboski et al. |
| 2009/0271109 A1 | 10/2009 | Lee et al. |
| 2010/0075652 A1 | 3/2010 | Keskar et al. |
| 2010/0088061 A1 | 4/2010 | Horodezky et al. |
| 2010/0136957 A1 | 6/2010 | Horodezky et al. |
| 2010/0190513 A1 | 7/2010 | Andreasson |
| 2010/0304754 A1 | 12/2010 | Czompo et al. |
| 2010/0318294 A1 | 12/2010 | Rosing et al. |

FOREIGN PATENT DOCUMENTS

| | | |
|---|---|---|
| EP | 1835259 A1 | 9/2007 |
| EP | 1972780 A1 | 9/2008 |

OTHER PUBLICATIONS

Yi, J. S. et al. (2005). "Context awareness via a single device attached accelerometer during mobile computing." Mobile HCI '05 Proceedings of the 7th international conference on Human computer interaction with mobile devices & services, 303-306. doi: 10.1145/1085777.1085839.
International Search Report and Written Opinion—PCT/US2012/037141—ISA/EPO—Aug. 1, 2012.
Real-Time Specialties: "Engine RPM Operations Manual", Jun. 17, 2010, XP002680357, Retrieved from the Internet: URL:http://tunelab-world.com/enginerpm.pdf [retrieved on Jul. 18, 2012].

*Primary Examiner* — Brian Zimmerman
*Assistant Examiner* — Cal Eustaquio
(74) *Attorney, Agent, or Firm* — Muncy, Geissler, Olds & Lowe, P.C.

(57) ABSTRACT

Methods and apparatus for determining context of a mobile device are provided. In an example, provided is a method for identifying an environment of a mobile device. The method includes receiving a motion sensor signal. The motion sensor signal can be received from an accelerometer and/or a gyroscope. If a frequency characteristic of an engine is detected in the motion sensor signal, a control signal is output identifying that the mobile device is located in a motor vehicle. The control signal can enable a vehicle navigation mode. The control signal can also be used to alert a user to the identified environment and/or change a feature of the mobile device. The method can also include receiving an audio signal from a microphone, detecting the engine vibration from the audio signal, and using the audio signal to confirm the detecting the engine vibration from the motion sensor signal.

40 Claims, 3 Drawing Sheets

VEHICLE CONTEXT AWARENESS BY DETECTING ENGINE RPM USING A MOTION SENSOR

FIELD OF DISCLOSURE

This disclosure relates generally to electronics, and more specifically, but not exclusively, to apparatus and methods for vehicle context awareness by detecting engine RPM using a motion sensor.

BACKGROUND

Context awareness is a mobile device's acquisition of information describing an environment within which the mobile device operates, and utilization of that information in the mobile device's decision-making processes. For example, knowing the mobile device's context can assist determining if certain features of the mobile device are enabled or disabled. In a conventional mobile device, such as a GPS or mobile phone, context awareness can be very helpful, and even imperative at times.

To detect a context of being located in a motor vehicle, conventional mobile devices use only a microphone to detect an engine's presence. However, the conventional device's microphone and associated audio circuitry are often fooled by loud sound sources, which leads to an erroneous context determination and an erroneous context-based decision.

Accordingly, there are long-felt industry needs for methods and apparatus that mitigate the shortcomings of conventional methods and apparatus, including determining vehicle context awareness by detecting engine RPM using a motion sensor, and a mobile device that can accurately self-determine the mobile device's environment.

SUMMARY

This summary provides a basic understanding of some aspects of the present teachings. This summary is not exhaustive in detail, and is neither intended to identify all critical features, nor intended to limit the scope of the claims.

In an example, methods and apparatus for identifying an environment of a mobile device are provided. An exemplary method includes receiving a motion sensor output signal and detecting a frequency characteristic of an engine in the motion sensor output signal. The motion sensor output signal can be received from an accelerometer and/or a gyroscope. If a frequency characteristic of the engine is detected in the motion sensor output signal, a control signal is created to identify that the mobile device is located in a motor vehicle. A vehicle navigation mode can be enabled with the control signal. The control signal can also be used to alert a user to the identified environment and/or to change a feature of the mobile device. If the frequency characteristic of the engine is not detected in the motion sensor output signal, a second control signal identifying that the mobile device is not in a motor vehicle can be created. The second control signal can be used to enable a pedestrian navigation mode. The motion sensor output signal can be received from an accelerometer and/or a gyroscope. The method can further include receiving an audio signal from a microphone, detecting the engine vibration from the audio signal, and using the audio signal to confirm the detecting the engine vibration with the motion sensor output signal.

In a further example, provided is a non-transitory computer-readable medium, comprising instructions stored thereon that, if executed by a processor, cause the processor to execute at least a part of the aforementioned method.

In another example, provided is an apparatus configured to identify an environment of a mobile device. The apparatus includes means for receiving a motion sensor output signal and means for detecting a frequency characteristic of an engine in the motion sensor output signal. The motion sensor output signal can be received from an accelerometer and/or a gyroscope. The apparatus also includes means for creating, if a frequency characteristic of an engine is detected in the motion sensor output signal, a control signal identifying that the mobile device is located in a motor vehicle. The apparatus can include means for enabling a vehicle navigation mode with the control signal, means for using the control signal to alert a user to the identified environment, and/or means for using the control signal to change a feature of the mobile device. Also provided are means for creating, if the frequency characteristic of an engine is not detected in the motion sensor output signal, a second control signal identifying that the mobile device is not in a motor vehicle. The apparatus can further include means for enabling a pedestrian navigation mode with the second control signal. The apparatus can also include means for receiving an audio signal from a microphone, means for detecting the engine vibration from the audio signal, and means for using the audio signal to confirm the detecting the engine vibration with the motion sensor output signal. At least a part of the apparatus can be integrated on a semiconductor die. The apparatus can further include a device, selected from the group consisting of a music player, video player, entertainment unit, navigation device, communications device, personal digital assistant (PDA), and a computer, into which the apparatus is integrated.

In another example, provided is an apparatus configured to identify an environment of a mobile device. The apparatus includes a processor configured to receive a motion sensor output signal and to detect a frequency characteristic of an engine in the motion sensor output signal. The motion sensor output signal can be received from an accelerometer and/or a gyroscope. The processor is also configured to create, if a frequency characteristic of an engine is detected in the motion sensor output signal, a control signal identifying that the mobile device is located in a motor vehicle. The processor can be further configured to enable a vehicle navigation mode with the control signal. The processor can also be configured to use the control signal to alert a user to the identified environment and/or change a feature of the mobile device. The processor can be further configured to create, if the frequency characteristic of an engine is not detected in the motion sensor output signal, a second control signal identifying that the mobile device is not in a motor vehicle. The processor can also be configured to enable a pedestrian navigation mode with the second control signal. Furthermore, the processor can also be configured to receive an audio signal from a microphone, detect the engine vibration from the audio signal, and use the audio signal to confirm the detecting the engine vibration with the motion sensor output signal.

At least a part of the apparatus can be integrated on a semiconductor die. The apparatus can further include a device, selected from the group consisting of a music player, video player, entertainment unit, navigation device, communications device, personal digital assistant (PDA), and a computer, into which the apparatus is integrated.

The foregoing has broadly outlined some of the features and technical advantages of the present teachings in order that the detailed description that follows may be better understood. Additional features and advantages are also described. The conception and disclosed embodiments can be readily utilized as a basis for modifying or designing other structures for carrying out the same purposes of the present teachings. Such equivalent constructions do not depart from the technology of the teachings as set forth in the appended claims. The novel features which are characteristic of the teachings, together with further objects and advantages, are better understood from the detailed description and the accompanying figures. Each of the figures is provided for the purpose of illustration and description only, and does not define limits of the present teachings.

BRIEF DESCRIPTION OF THE DRAWINGS

The accompanying drawings are presented to describe examples of the present teachings, and are not provided as limitations.

Figure 1A:
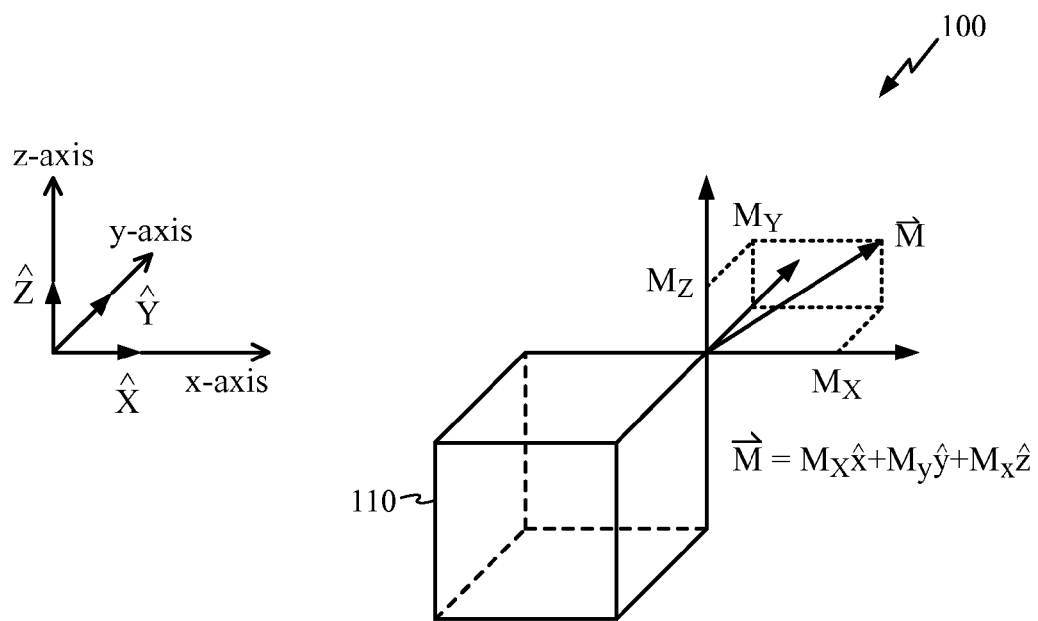
FIG. 1A depicts an exemplary coordinate system for representing linear movement as measured by a motion sensor.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Examples of the current teachings are disclosed in this application's text and related drawings. The examples advantageously address the long-felt industry needs, as well as other previously unidentified needs, and mitigate shortcomings of the conventional methods and apparatus. Alternate embodiments may be devised without departing from the scope of the invention. Additionally, conventional elements of the current teachings may not be described in detail, or may be omitted, to avoid obscuring aspects of the current teachings.

The word "exemplary" is used herein to mean "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage or mode of operation. Use of the terms "in one example", "an example", "in one feature" and/or "a feature" in this specification does not necessarily refer to the same feature and/or example. Furthermore, a particular feature and/or structure can be combined with one or more other features and/or structures.

It should be noted that the terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As employed herein two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

It should be understood that the term "signal" can include any signal such as a data signal, audio signal, video signal, multimedia signal. Information and signals can be represented using any of a variety of different technologies and techniques. For example, data, instructions, commands, information, signals, bits, symbols, and chips that can be referenced throughout this description can be represented by voltages, currents, electromagnetic waves, magnetic fields or particles, optical fields or particles, or any combination thereof.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed, or that the first element must precede the second element. Also, unless stated otherwise a set of elements can comprise one or more elements. In addition, terminology of the form "at least one of: A, B, or C" used in the description or the claims means "A or B or C or any combination of these elements."

The terminology used herein is for the purpose of describing particular embodiments only and is not intended to be limiting of embodiments of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In the following description, certain terminology is used to describe certain features. The term "mobile device" includes, but is not limited to, a global positioning device (e.g., a global positioning system receiver), a device having an inertial navigation system (INS), a mobile phone, a mobile communication device, personal digital assistant, mobile palm-held computer, a wireless device, and/or other types of mobile devices typically carried by individuals and/or having some form of communication capabilities (e.g., wireless, infrared, short-range radio, etc.).

Methods and apparatus for determining vehicle context awareness by detecting engine RPM using a motion sensor are provided. In an example, provided is a method for identifying an environment of a mobile device. The method includes receiving a motion sensor signal. The motion sensor signal can be received from an accelerometer and/or a gyroscope. If a frequency characteristic of an engine is detected in the motion sensor signal, a first control signal is output, identifying that the mobile device is located in a motor vehicle. The first control signal can enable a vehicle navigation mode. The first control signal can be used to alert a user to the identified environment and/or change a feature of the mobile device. If the frequency characteristic of an engine is not detected, a second control signal identifying that the mobile device is not in a motor vehicle is output. The second control signal can enable a pedestrian navigation mode. The method can also include receiving an audio signal from a microphone, detecting the engine vibration from the audio signal, and using the audio signal to confirm detecting the engine vibration.

A mobile device can include a single motion sensor or multiple motion sensors, which convert physical phenomena, such as an engine vibration, into an electrical signal (i.e., a motion sensor output signal). Examples of motion sensors include, for example: (1) an accelerometer used to sense the direction of gravity and other linear forces; and (2) a gyroscope used to measure a Coriolis effect, heading changes, and rotation.

A motion sensor output can enable a feature of a mobile application, such as an inertial navigation system, depending on which sensors are integrated into the mobile device. Some applications can employ more than one measurement from at least one motion sensor, and can employ multiple degrees (axes) of observability from a motion sensor. Further, different applications can employ different combinations of motion sensors, where the motion sensors perform different roles.

FIG. 1A depicts an exemplary coordinate system 100 for representing linear movement as measured by a motion sensor, such as an accelerometer 110. In general, the accelerometer 110 detects motion and generates information (e.g., a motion sensor output signal) indicative of movement along one, two, or three axes. FIG. 1A shows the Cartesian coordinate space (x, y, z) for representing the linear movement with respect to scalar values, a series of scalar values, and time varying functions ($M_X$, $M_Y$, $M_Z$), as measured by the accelerometer 110. Some accelerometers 110 can provide a magnitude, while others provide an indication of movement without a magnitude. An accelerometer 110 can measure linear movement (vector M) along a line with reference to one, two or three linear directions, often referenced with the Cartesian coordinates (x, y, z). For example, if one-dimensional, the accelerometer 110 can provide measurements to indicate linear movement along a single axis (e.g., the x-axis). If two-dimensional, the accelerometer 110 can provide measurements to indicate linear movement in a plane along two axes (e.g., both the x-axis and the y-axis). Further, if three-dimensional, the accelerometer 110 can provide measurements to indicate linear movement in three-dimensional space (e.g., along the x, y, and z-axes). A three-dimensional accelerometer can comprise a two-dimensional accelerometer combined with a one-dimensional accelerometer, or can comprise three one-dimensional accelerometers. The accelerometer 110 can provide measurements in terms of linear acceleration (in units representing distance per units of time squared; e.g., [m/sec$^2$]). Linear motion (vector M) can be represented by three values in vector form $M=M_X X+M_Y Y+M_Z Z$, where ($M_X$, $M_Y$, $M_Z$) are magnitudes, scalar values, a series of scalar values, and/or time varying functions, and (X, Y, Z) are unit vectors with respect to the origin of the Cartesian coordinate system (x, y, z). Alternatively, a non-Cartesian coordinate system can be used, such as a coordinate system aligned with a frame of the mobile device.

Figure 1B:
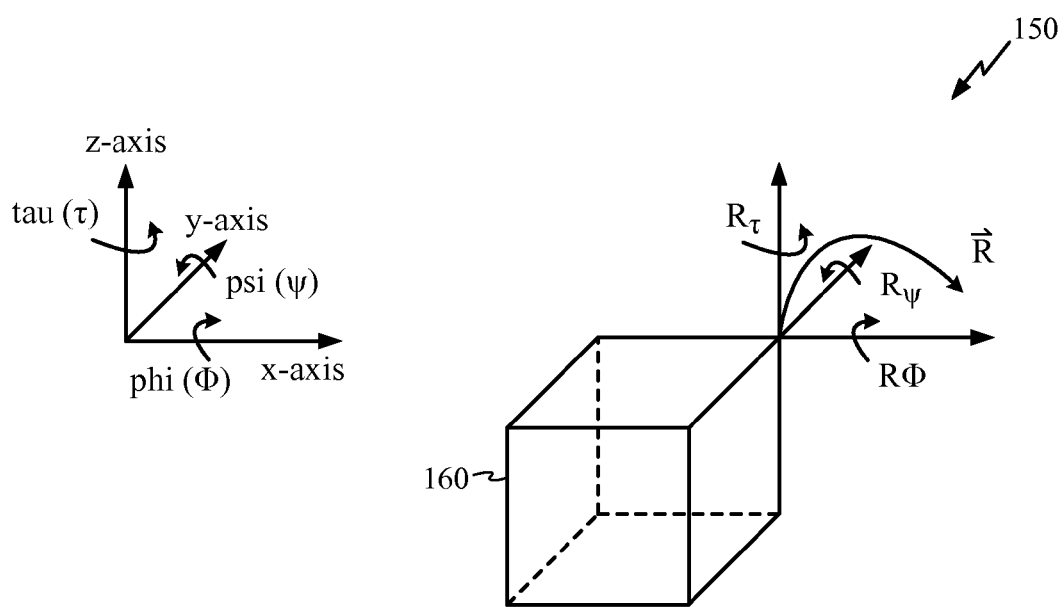
FIG. 1B depicts an exemplary coordinate system for representing rotational movement as measured by a motion sensor.

FIG. 1B depicts an exemplary coordinate system 150 for representing rotational movement as measured by a motion sensor, such as a gyroscope 160. The gyroscope 160 can detect motion and produce information indicative of angular movement about one, two, or three axes. FIG. 1B shows a coordinate system ($\tau$, $\phi$, $\psi$) for representing rotational movement with respect to scalar values, a series of scalar values, and/or time varying functions ($R_\tau$, $R_\phi$, $R_\psi$) as measured by the gyroscope 160. Thus, the gyroscope 160 can measure rotational movement (vector R) about one, two or three axes. In one particular implementation, gyroscopic rotation can be measured in terms of coordinates ($\tau$, $\phi$, $\psi$), where tau ($\tau$) represents yaw or rotation about the z-axis, phi ($\phi$) represents roll or rotation about the x-axis, and psi ($\psi$) represents pitch or rotation about the y-axis. In another implementation, the gyroscope 160 can comprise a one-dimensional gyroscope to provide measurements indicating rotational movement about a first axis. In another implementation, the gyroscope 160 can comprise a two-dimensional gyroscope to provide measurements indicating rotational movement about a first axis and a second axis. In yet another implementation, the gyroscope 160 can comprise a three-dimensional gyroscope to provide measurements indicating rotational movement about first, second, and third axes. The three-dimensional gyroscope can comprise a two-dimensional gyroscope combined with a one-dimensional gyroscope, or can comprise three one-dimensional gyroscopes. The gyroscope 160 can provide measurements in terms of angular velocity (in units representing change in an angle per unit of time; e.g., [rad/sec]), and/or an angle (in units representing an angle; e.g., [rad]). Rotational motion (vector R) can be represented by three scalar values, a series of scalar values, and/or time varying functions in vector from, where $R=R_\tau \tau + R_\phi \phi + R_\psi \psi$, where ($R_\tau$, $R_\phi$, $R_\psi$) are scalar values, a series of scalar values, and/or time varying functions, and where ($\tau$, $\phi$, $\psi$) are unit vectors in with respect to the rotational coordinate system ($\tau$, $\phi$, $\psi$).

In the case of navigation, accelerometers and gyroscopes ("gyros") can be used to provide a motion sensor output signal based on at least one of the six axes of observability (x, y, z, $\tau$, $\phi$, $\psi$). An accelerometer can sense linear motion (i.e., translation in a plane, such as a horizontal plane). Translation can be measured with reference to at least two axes. The accelerometer can also measure the mobile device's tilt (i.e., roll and/or pitch). Thus, with a single three-dimensional accelerometer, the mobile device's motion in Cartesian coordinate space (x, y, z) can be sensed, and the direction of gravity can be sensed to estimate the mobile device's roll ($\tau$) and pitch ($\phi$). Since accelerometers cannot easily differentiate between the mobile device's linear motion and tilt, a gyroscope can be used to measure the rotation about (x, y, z) coordinates, that is, roll ($\tau$), pitch ($\phi$), and yaw ($\psi$), which is sometime referred to as azimuth or heading. In movement detection applications, linear and angular accelerometers and/or gyroscopes can be integrated into the mobile device to provide adequate degrees of observability. The accelerometer 110 can sense linear movement while the gyroscope 160 can measure angular movement such as a tilt or roll. Integrating two separate accelerometers 110 or a combination of the accelerometer 110 and the gyroscope 160 into a mobile device can be used to sense linear movement as well as angular movement.

Figure 2:
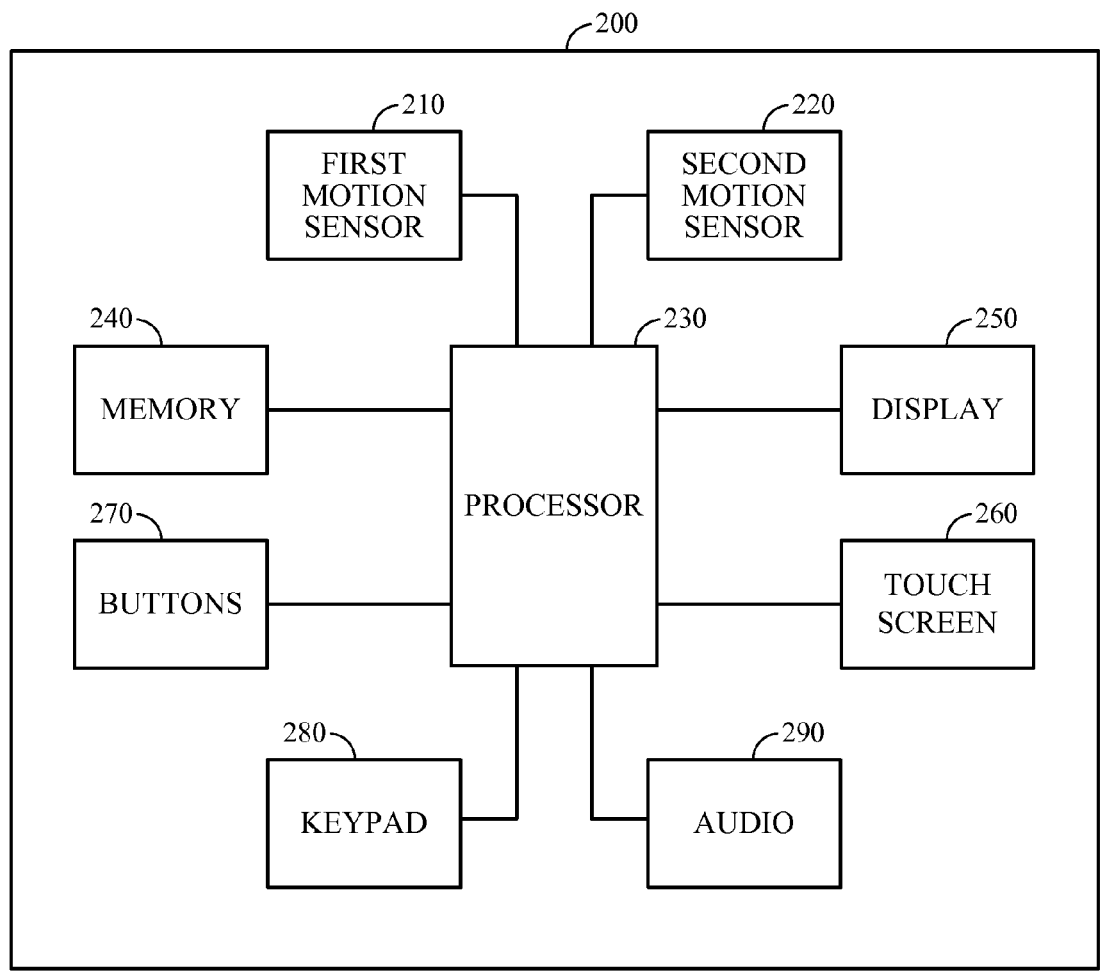
FIG. 2 is an exemplary schematic diagram of a mobile device.

FIG. 2 is an exemplary schematic diagram of a mobile device 200. The mobile device 200 can include a first motion sensor 210, a second motion sensor 220, a processor 230, a memory 240, and a display 250. The first sensor 210 can include the accelerometer 110, and the second sensor 220 can include the gyroscope 160. The accelerometer 110 provides an accelerometer output signal to the processor 230, and the gyroscope 160 provides a gyroscope output signal to the processor 230. Although only two motion sensors are shown in FIG. 2, it should be appreciated that additional, or fewer, motion sensors can be used. Further, a single motion sensor (e.g., the first motion sensor 210) can be configured to measure both linear and angular motion. The mobile device 200 also includes devices and circuitry to accept user input, such as a touch screen 260, a button 270, a keypad 280, and/or an audio device 290 (e.g., a microphone). The mobile device 200 also includes devices and circuitry to provide output data, such as the display 250, and/or the audio device 290 (e.g., a speaker).

In an example, the processor 230 receives a motion sensor output signal from the accelerometer 110 and/or the gyroscope 160. The processor 230 analyzes the spectrum of the motion sensor output signal, and compares the motion sensor output signal to frequencies and/or frequency ranges that are characteristic to engine vibrations. If the motion sensor output signal is substantially similar to the frequencies and/or the frequency ranges that are characteristic of engine vibrations, then a determination is made that the processor 230 is in a context of a motor vehicle. If the processor 230 is in a particular context, then a device feature, such as a vehicle or pedestrian navigation mode, can be enabled. The user of the device can also be alerted to the context. The mobile device 200 advantageously determines vehicle context awareness by detecting engine RPM from a motion sensor output signal, and can accurately self-determine the mobile device's environment. The processor may analyze the motion sensor output signal by way of a Fast Fourier Transform (FFT), frequency filter banks, and/or by other means that are suitable to detect the presence of frequencies in a signal. In a different implementation, the processor may use a bandpass frequency filter to determine if engine vibration signals are present with a suitably selected minimum amplitude, and if so, the vehicle context determination is made.

In a further example, the processor 230 receives an audio signal from the audio device 290 (e.g., a microphone). The processor 230 analyzes the audio signal to detect an audio characteristic of an engine vibration. Detecting the engine vibration from the audio signal can confirm a prior determination that the processor 230 is in a context of a motor vehicle. This advantageously increases context detection accuracy.

In an example, at least a portion of the processor 230 is integrated into a device, selected from the group consisting of a music player, video player, entertainment unit, navigation device, communications device, personal digital assistant (PDA), and a computer, into which the processor 230 is integrated. At least a portion of the mobile device 200 can be integrated on a semiconductor die.

Figure 3:
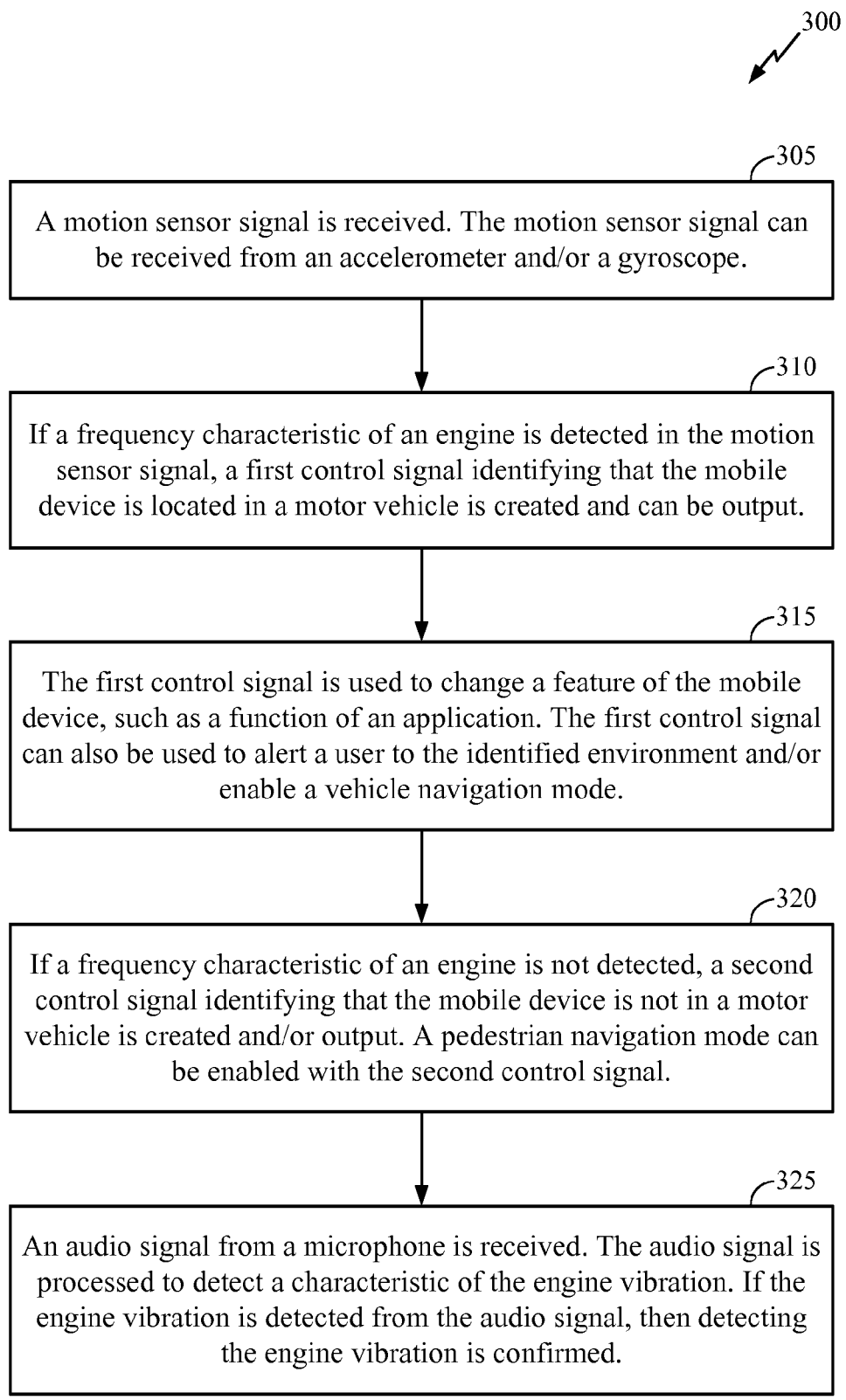
FIG. 3 depicts an exemplary method for identifying an environment of a mobile device.

FIG. 3 depicts an exemplary method for identifying an environment of a mobile device 300. The method for identifying an environment of a mobile device 300 can be performed by the apparatus described hereby, such as the processor 230.

In step 305, a motion sensor signal is received. The motion sensor signal can be received from an accelerometer and/or a gyroscope.

In step 310, if a frequency characteristic of an engine is detected in the motion sensor signal, a first control signal identifying that the mobile device is located in a motor vehicle is created and can be output. A pedestrian and/or vehicle navigation mode can be enabled with the first control signal.

In optional step 315, the first control signal is used to change a feature of the mobile device, such as a function of an application. The first control signal can also be used to alert a user to the identified environment and/or enable a vehicle navigation mode.

In step 320, if a frequency characteristic of an engine is not detected, a second control signal identifying that the mobile device is not in a motor vehicle is created and/or output. The pedestrian and/or the vehicle navigation mode can be enabled with the second control signal.

In optional step 325, an audio signal from a microphone is received. The audio signal is processed to detect a characteristic of the engine vibration. If the engine vibration is detected in the audio signal, then detecting the engine vibration is confirmed.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In some aspects, the teachings herein can be employed in a multiple-access system capable of supporting communication with multiple users by sharing the available system resources (e.g., by specifying one or more of bandwidth, transmit power, coding, interleaving, and so on). For example, the teachings herein can be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein can be designed to implement one or more standards, such as IS-95, cdma2000, IS-856, W-CDMA, TDSCDMA, and other standards. A CDMA network can implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein can be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure can be described using 3GPP terminology, it is to be understood that the teachings herein can be applied to 3GPP (e.g., Rel99, Rel5, Rel6, Rel7) technology, as well as 3GPP2 (e.g., 1xRTT, 1xEV-DO RelO, RevA, RevB) technology and other technologies. The techniques can be used in emerging and future networks and interfaces, including Long Term Evolution (LTE).

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

An embodiment of the invention can include a computer readable media embodying a method described herein. Accordingly, the invention is not limited to illustrated examples and any means for performing the functionality described herein are included in embodiments of the invention.

The disclosed devices and methods can be designed and can be configured into GDSII and GERBER computer files, stored on a computer readable media. These files are in turn provided to fabrication handlers who fabricate devices, based on these files, with a lithographic device. The resulting products are semiconductor wafers that are then cut into semiconductor die and packaged into a semiconductor chip. The chips are then employed in devices described herein.

Nothing that has been stated or illustrated is intended to cause a dedication of any component, step, feature, object, benefit, advantage, or equivalent to the public, regardless of whether it is recited in the claims.

While this disclosure shows exemplary embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order.

What is claimed is:

1. A method for identifying an environment of a mobile device, comprising:
   receiving a motion sensor output signal;
   detecting a frequency characteristic of an engine in the motion sensor output signal; and
   creating, if the frequency characteristic of the engine is detected in the motion sensor output signal, a control signal identifying that the mobile device is located in a motor vehicle.

2. The method of claim 1, further comprising creating, if the frequency characteristic of the engine is not detected in the motion sensor output signal, a second control signal identifying that the mobile device is not in a motor vehicle.

3. The method of claim 2, further comprising enabling a pedestrian navigation mode with the second control signal.

4. The method of claim 1, wherein the motion sensor output signal is received from an accelerometer.

5. The method of claim 1, wherein the motion sensor output signal is received from a gyroscope.

6. The method of claim 1, further comprising enabling a vehicle navigation mode with the control signal.

7. The method of claim 1, further comprising using the control signal to alert a user to an identified environment.

8. The method of claim 1, further comprising using the control signal to change a feature of the mobile device.

9. The method of claim 1, further comprising:
   receiving an audio signal from a microphone;
   detecting an engine vibration from the audio signal; and
   using the audio signal to confirm detecting the engine vibration.

10. An apparatus configured to identify an environment of a mobile device, comprising:
    means for receiving a motion sensor output signal;
    means for detecting a frequency characteristic of an engine in the motion sensor output signal; and
    means for creating, if the frequency characteristic of the engine is detected in the motion sensor output signal, a control signal identifying that the mobile device is located in a motor vehicle.

11. The apparatus of claim 10, further comprising means for creating, if the frequency characteristic of the engine is not detected in the motion sensor output signal, a second control signal identifying that the mobile device is not in a motor vehicle.

12. The apparatus of claim 11, further comprising means for enabling a pedestrian navigation mode with the second control signal.

13. The apparatus of claim 10, wherein the motion sensor output signal is received from an accelerometer.

14. The apparatus of claim 10, wherein the motion sensor output signal is received from a gyroscope.

15. The apparatus of claim 10, further comprising means for enabling a vehicle navigation mode with the control signal.

16. The apparatus of claim 10, further comprising means for using the control signal to alert a user to the identified environment.

17. The apparatus of claim 10, further comprising means for using the control signal to change a feature of the mobile device.

18. The apparatus of claim 10, further comprising:
    means for receiving an audio signal from a microphone;
    means for detecting an engine vibration from the audio signal; and
    means for using the audio signal to confirm detecting the engine vibration.

19. The apparatus of claim 10, wherein at least a part of the apparatus is integrated on a semiconductor die.

20. The apparatus of claim 10, further comprising a device, selected from a group consisting of a music player, video player, entertainment unit, navigation device, communications device, personal digital assistant (PDA), and a computer, into which the apparatus is integrated.

21. An apparatus configured to identify an environment of a mobile device, comprising a processor configured to:
    receive a motion sensor output signal;
    detect a frequency characteristic of an engine in the motion sensor output signal; and
    create, if the frequency characteristic of the engine is detected in the motion sensor output signal, a control signal identifying that the mobile device is located in a motor vehicle.

22. The apparatus of claim 21, wherein the processor is further configured to create, if the frequency characteristic of the engine is not detected in the motion sensor output signal, a second control signal identifying that the mobile device is not in a motor vehicle.

23. The apparatus of claim 22, wherein the processor is further configured to enable a pedestrian navigation mode with the second control signal.

24. The apparatus of claim 21, wherein the motion sensor output signal is received from an accelerometer.

25. The apparatus of claim 21, wherein the motion sensor output signal is received from a gyroscope.

26. The apparatus of claim 21, wherein the processor is further configured to enable a vehicle navigation mode with the control signal.

27. The apparatus of claim 21, wherein the processor is further configured to use the control signal to alert a user to the identified environment.

28. The apparatus of claim 21, wherein the processor is further configured to use the control signal to change a feature of the mobile device.

29. The apparatus of claim 21, wherein the processor is further configured to:
    receive an audio signal from a microphone;
    detect the engine vibration from the audio signal; and
    use the audio signal to confirm detecting the engine vibration.

30. The apparatus of claim 21, wherein at least a part of the apparatus is integrated on a semiconductor die.

31. The apparatus of claim 21, further comprising a device, selected from the group consisting of a music player, video player, entertainment unit, navigation device, communications device, personal digital assistant (PDA), and a computer, into which the apparatus is integrated.

32. A non-transitory computer-readable medium, comprising instructions stored thereon that, if executed by a processor, cause the processor to execute a method comprising:
    receiving a motion sensor output signal;
    detecting a frequency characteristic of an engine in the motion sensor output signal; and
    creating, if the frequency characteristic of the engine is detected in the motion sensor output signal, a control signal identifying that a mobile device is located in a motor vehicle.

33. The non-transitory computer-readable medium of claim 32, wherein the method further comprises creating, if the frequency characteristic of the engine is not detected in the motion sensor output signal, a second control signal identifying that the mobile device is not in a motor vehicle.

34. The non-transitory computer-readable medium of claim 32, wherein the method further comprises enabling a pedestrian navigation mode with the second control signal.

35. The non-transitory computer-readable medium of claim 32, wherein the motion sensor output signal is received from an accelerometer.

36. The non-transitory computer-readable medium of claim 32, wherein the motion sensor output signal is received from a gyroscope.

37. The non-transitory computer-readable medium of claim 32, wherein the method further comprises enabling a vehicle navigation mode with the control signal.

38. The non-transitory computer-readable medium of claim 32, wherein the method further comprises using the control signal to alert a user to the identified environment.

39. The non-transitory computer-readable medium of claim 32, wherein the method further comprises using the control signal to change a feature of the mobile device.

40. The non-transitory computer-readable medium of claim 32, wherein the method further comprises:
    receiving an audio signal from a microphone;
    detecting the engine vibration from the audio signal; and
    using the audio signal to confirm detecting the engine vibration.

\* \* \* \* \*